Patented Aug. 22, 1950

2,519,775

UNITED STATES PATENT OFFICE 2,519,775

CHEWING GUM BASE

Boris N. Lougovoy, Jackson Heights, N. Y., assignor to American Chicle Company, Long Island City, N. Y., a corporation of New Jersey No Drawing. Application December 11, 1945, Serial No. 634,390

1 Claim. (Cl. 99—135)

The characteristic of my invention is that it provides a satisfactory chewing gum base incorporating one or more of several synthetic resins which possess advantages, but which heretofore have not been adapted for use, in chewing gum bases which closely simulate bases having high proportions of natural chicle. Thus commercial chewing gum bases containing substantial amounts of polyvinyl acetate have been attempted, but have been found inferior due to the dead plastic character of the chew. Due to the very limited solubility and compatibility of polyvinyls with rubber or natural gums it has not been possible to use the polyvinyls in such connection as to any substantial quantity. This lack of solubility and compatibility is particularly noticeable with crepe rubber and with natural gums containing rubber-like gutta, such as jelutong and the Perillos.

By means of the invention I am able to provide a high-grade chewing gum base incorporating substantial proportions of synthetic resins with natural elastomers or crude gums, the resins being, for example, polyvinyl acetate resins, modified styrene resins and polyvinyl resins, either singly or in combination. This is accomplished by employing in the base an agent which renders the synthetic resins capable of either blending with the rubber materials and/or crude gums or of neutralizing the normal effect of the synthetic resins in impairing the original elastic properties of such rubber materials and crude gums.

Such agent is a polymer of the general composition ($-SC_2H_4OCH_2OC_2H_4S-$), the group to be called, for brevity, "T elastomers." The physical properties of these polymers can be varied from soft plastic to firm rubbery materials. As in all cases of high polymers, their solubility and compatibility with other materials change with the degree of polymerization. Polymers of the above type, having a rather wide softening point (mercury method) from about 45° C. to about 110° C., are found to be suitable for the purpose of this invention. The choice of specific polymer, within the above range of softening point, depends upon the nature of the modifying materials, such as resins and waxes employed in a chewing gum base. By the proper selection of the type of polymer, the desired degree of "elasticity" of the chew can be obtained. For most purposes, I prefer to use T elastomers having softening points around 100° C. to 108° C. These elastomers can be used either in a completely coagulated and dehydrated form or in a semi-coagulated stage in the form of a filter press cake.

The addition of a T elastomer to a mixture of de-polymerized rubber and polyvinyl acetate accomplishes the mutual blending, thus permitting the introduction of rubber into the combination with polyvinyl acetate.

The following materials made by the Thiokol Corporation may be mentioned as examples of T elastomers suitable for the purpose:

|  | Softening point, °C. |
|---|---|
| Coagulum P-38C | 71 |
| Coagulum P-35C | 107 |
| Coagulum P-36C | 49 |
| Coagulum GR-6 | 105 |
| Coagulum CB-1 or CB-2 | 100 |
| Coagulum P-69C | Around 100 |

In order to obtain the desired chewing characteristics in a gum base, it is important that the elastomeric component has definite elastic properties. With respect to chewing gum bases, the suitability of an elastomer can be to a great extent judged by its softening or melting point, and by the measurements of its "rubberiness" in addition, of course, to the proper compatibilities with the other constituents. The first physical constant may be determined by the conventional mercury method, and the second one by plastometer measurements. Below are given plastometer measurements of T elastomers, as against de-polymerized crepe rubber of the grade commonly employed in chewing gum base. The measurements were made by Mooney's plastometer. Reference to non-de-polymerized rubber is given to illustrate the degree of depolymerization of the standard material.

|  | Plastometer Readings at 112° F. at the end of— | | | Assigned Value |
|---|---|---|---|---|
|  | 1 Minute | 2 Minutes | 3 Minutes |  |
| No. 1 Smoked Sheet | 87 | 84 | 82 | 83 |
| Std. Depolymerized Rubber | 8 | 7 | 6 | 6 |
| T Elastomer, CB-1 | 8 | 7 | 7 | 7 |

Another material which can be used to advantage in the presence of T elastomers is modified polystyrene resins, such as the commercial resins known as Piccolastics. This type of resin is also very attractive for chewing gum users, because of its elastic character. The Piccolastic resins either do not blend with rubber materials and crude gums or very seriously impart their original elastic properties. As in the case of polyvinyls, these disadvantages are obviated in the presence of T elastomers.

The following examples will illustrate the foregoing, but it should be understood that the proportions given are solely for purposes of illustration, and that they can be modified in the process of adjusting the desired properties of the finished material. I also do not intend to limit myself to specific selections of complementary materials, such as resins, waxes, and softeners which may be substituted with other products having similar properties. In the examples below the following materials are given by their trade names:

Piccolastics—modified styrene resins—manufactured by the Pennsylvania Industrial Chemical Corp.

Gelva—polyvinyl resins—manufactured by the Shawinigan Products Corp.; the number following the name designates the viscosity of the polymer.

Vinylites—or PVA—polyvinyl acetate resins—made by Carbon & Carbide Chemical Corporation.

Arochem 345—a modified terpene condensate M. P. 110–115° C.—made by Strock and Wittenberg.

Santowaxes—terphenyls—made by the Monsanto Chemical Co. The letters M, O or P indicate metha, ortho or para isomers.

Softeners—when not specified, indicate a mixture of 2 parts lanolin, 2 parts Carbowax 4000, and 1 part soya lecithin.

|  | Example I | Example II | Example III |
|---|---|---|---|
| Depolymerized crepe rubber | 15 | 15 | 15 |
| T Coagulum, P-38C | 10 |  | 10 |
| T Coagulum, P-35C |  | 10 |  |
| Santowax M | 20 | 20 | 15 |
| Gelva, 2½ | 25 | 25 | 25 |
| Softener | 15 | 15 | 10 |
| Candelilla Wax |  |  | 10 |
| Talc | 15 | 15 | 15 |

|  | Example IV | Example V |
|---|---|---|
| Natural Gums: |  |  |
| Chicle | 10 |  |
| Chilte |  | 10 |
| T Coagulum, P-38C |  | 15 |
| T Coagulum, P-36C | 15 |  |
| Santowax M |  | 15 |
| Santowax P | 15 |  |
| Gelva, 2½ | 25 | 25 |
| Softener | 10 | 10 |
| Candelilla Wax | 10 | 10 |
| Talc | 15 | 15 |

*Example VI*

| Depolymerized crepe rubber | 10 |
|---|---|
| T-Elastomer, GR-6 | 18 |
| Arochem 345 | 18 |
| Gelva, 2½ | 30 |
| Candelilla Wax | 12 |
| Carbowax 4000 | 5 |
| Lanolin | 5 |
| Monostearin | 2 |

*Example VII*

| Depolymerized crepe rubber | 10 |
|---|---|
| T Elastomer CB-1 | [1]15 |
| Arochem 345 | 15 |
| Gelva, 2½ | 25 |
| Candelilla Wax | 10 |
| Softener | 10 |
| Talc | 15 |

[1] Used in filter cake form.

|  | Example VIII | Example IX | Example X |
|---|---|---|---|
| Natural Gum—Chilte |  |  | 10 |
| Piccolastic D-100 Special | 10 | 10 | 10 |
| T Elastomer CB-1 | 15 |  | 10 |
| T Elastomer P-69C |  | 15 |  |
| Arochem 345 | 15 | 15 | 10 |
| Gelva, 2½ | 25 |  | 25 |
| PVA 79, Visc. 1.7 |  | 25 |  |
| Candelilla Wax | 12 | 12 | 12 |
| Softener | 8 | 8 | 8 |
| Talc | 15 | 15 | 15 |

*Example XI*

75 parts of Base in Example VIII
25 parts of Gum Chicle

In the claim, the term "natural gum" includes crude gums, rubber materials and rubber-like materials.

Having described my invention, what I claim and desire to secure by Letters Patent, is as follows:

A chewing gum base including a natural gum, polyvinyl acetate, and a polymer of the composition ($-SC_2H_4OCH_2OC_2H_4S-$), having a softening point (mercury method) in the range about 45° C.–110° C.

BORIS N. LOUGOVOY.

REFERENCES CITED

The following references are of record in the file of this patent:

UNITED STATES PATENTS

| Number | Name | Date |
|---|---|---|
| 1,479,330 | Snelling | Jan. 1, 1924 |
| 2,007,965 | Ellis | July 16, 1935 |
| 2,069,477 | Manson | Feb. 2, 1937 |
| 2,301,331 | Schantz | Nov. 10, 1942 |